United States Patent [19]
Den Uyl et al.

[11] Patent Number: 5,662,952
[45] Date of Patent: Sep. 2, 1997

[54] INJECTION MOULD WITH A PRE-OPENING JACK

[75] Inventors: Hendrik Den Uyl, Vianen; Johannes Teijgeler, Leerdam, both of Netherlands

[73] Assignee: TPP Axxicon B.V., Vianen, Netherlands

[21] Appl. No.: 491,941

[22] PCT Filed: Feb. 2, 1994

[86] PCT No.: PCT/NL94/00026

§ 371 Date: Sep. 14, 1995

§ 102(e) Date: Sep. 14, 1995

[87] PCT Pub. No.: WO94/17978

PCT Pub. Date: Aug. 18, 1994

[30] Foreign Application Priority Data

Feb. 2, 1993 [NL] Netherlands ............. 9300206

[51] Int. Cl.$^6$ .................. B29C 45/40; B29C 45/64
[52] U.S. Cl. ............. 425/556; 425/441; 425/444; 425/575; 425/589
[58] Field of Search ............. 264/161, 328.1, 264/328.11, 334; 425/289, 441, 444, 556, 575, 589

[56] References Cited

U.S. PATENT DOCUMENTS 4,085,178  4/1978  McNeely et al. ............. 264/161 X

FOREIGN PATENT DOCUMENTS 1553114   1/1969  France .
644354  10/1950  United Kingdom .
2 124 968  2/1984  United Kingdom .

OTHER PUBLICATIONS

Abstract of Japan 59–179310 (Published Oct. 11, 1984).
Abstract of Japan 63–251215 (Published Oct. 18, 1988).

*Primary Examiner*—Leo B. Tentoni
*Attorney, Agent, or Firm*—Young & Thompson

[57] ABSTRACT

Injection mold comprising at least two mold sections (2, 3) between which a mold cavity is delimited. One (3) of the mold sections is provided with an ejector (42) for removing the product after injection molding. The other mold section (2) is provided with a gate (5). To enable the solidified sprue to be separated from the molded article, a bush (8) is also present in which the gate (6) likewise extends. This bush (8) is constructed to be movable to a limited extent relative to the mold section (2) in which the other part (5) of the gate is made. As a result the sprue can be pulled away from the article in a guaranteed manner. The movement of the bush (8) is controlled by a jack (16, 17). Consequently, controlled breaking of the sprue is possible and the advantage arises that, by releasing the pressure on the jack (16, 17), no force has to be overcome when the mold is closed.

4 Claims, 3 Drawing Sheets

INJECTION MOULD WITH A PRE-OPENING JACK

FIELD OF THE INVENTION

The present invention relates to an injection mould with a pre-opening jack.

BACKGROUND OF THE INVENTION

An injection mould of this type is disclosed in PATENT ABSTRACTS OF JAPAN, Vol. 13, No. 41 (M-791) (3389), 30 Jan. 1989. In this known mould the mould sections which are moved relative to one another to break a sprue are driven apart by spring force. After these mould sections have moved a limited distance apart, the actual mould is opened to release the product. In order to ensure that the sprue of the product is broken before release starts and to guarantee the sequence of this movement, it is necessary to use relatively heavy springs to guarantee breakage of the sprue. Even if relatively heavy springs of this type are used it is still not always guaranteed that breakage takes place.

This relatively large spring force has to be overcome again when closing the mould before the start of a new injection cycle. This implies that any safety measures fitted which serve to stop the closing movement of the mould if undesired articles are present between the mould sections, or in the case of other irregularities, must have a minimum response force which is equal to the spring pressure to be overcome.

In practice this means that moulds of this type can not be provided with a blocking protection which functions realistically. Consequently it is necessary to fit complex cover constructions around the mould, the movement of the various sections of the mould being interrupted as soon as such a cover is opened. This is a circuitous and undesirable construction with which, moreover, it is not possible to prevent damage occurring to the product and/or mould during the closing movement if, for example, injection moulding residues are in the wrong place. The use of a cover is merely a safety precaution for operators and does not protect the mould and/or the products to be injected. The aim of the invention is to overcome these disadvantages.

SUMMARY OF THE INVENTION

The insight on which the invention is based is not to carry out the breaking movement of the sprue relative to the product using spring force, which, in turn, has to be overcome when the mould is closed, but with the aid of jack means. Said jack means, which are operated by means of a fluid, are pressurised to break the sprue. With this arrangement any desired force can be chosen. The further opening movement of the mould takes place only after the sprue has been broken off. The pressure on said jack means can be released when the mould is closed, so that hardly any force has to be overcome in order to place said jack means in the starting position. If desired, spring means or further jack means can be present to move the jack means back into the starting position thereof after the pressure thereon has been released. In this way it is possible, using an injection mould according to the invention, during closing to measure, in a very sensitive manner, the resistance which has to be overcome by the closing mechanism. If said resistance exceeds a relatively low value, the closing operation can be stopped immediately. This implies that, if residual product or other components are present in the closing path of the injection mould, the closing movement can be suspended without damage being caused to any component.

It is pointed out that French Patent 1,553,114 disclosed an injection mould in which the injection head is arranged so that it is movable backwards and forwards. The sprue is broken with the aid of air pressure, which is applied between two adjoining mould section. Leakage will occur as soon as any movement takes place between said two mould sections, with the consequence that very large amounts of air are required to break the sprue, this being associated with highly undesirable side effects.

In the case of the construction according to said French patent publication, the product is blown towards the injection nozzle. This, like the movable construction of the injection nozzle, results in increased susceptibility to malfunction. Moreover, as a consequence of the chosen construction there is a risk that when the mould sections are moved apart one of said sections will skew and become trapped in the other.

A construction according to the invention can be used in the case of an injection mould in which the mould cavity is delimited by two mould sections. It is obviously possible to construct the mould cavity from three or more mould sections. This is frequently desirable, especially on the grounds of process engineering considerations. In this way it is possible to produce highly complex articles and to control the injection and solidification of the plastic composition.

According to an advantageous embodiment of the injection mould described above, main operating means are present to move that mould section which is opposite the mould section comprising the gates relative to said section. This is generally known in the prior art, but these publications propose the use of auxiliary operating means to move the mould section comprising the gate relative to a fixed injection head.

The movement of the various mould sections can be optimised by installing auxiliary operating means. This leads on the one hand to the possibility of obtaining a larger opening for ejection of the product and, on the other hand, to the possibility of shortening the time cycle, because the mould sections can be closed more efficiently.

Although the invention can be used in conjunction with all injection moulds according to the prior art, it is used in particular in conjunction with a so-called quick-change mould. When producing relatively short runs, the time taken to change to the mould for another product to a large extent determines the price of the products finally obtained. The aim is therefore to carry out mould changes as rapidly as possible. In the prior art the change-over time has fallen in recent years from 5 to 6 hours to 2 hours.

The aim of the present invention is to provide a quick-change mould with which change-over can be carried out even more rapidly.

This is achieved by means of an injection mould, as described above, comprising a mother mould in which an auxiliary mould is interchangeably incorporated, which auxiliary mould comprises at least two mould sections delimiting the mould cavity, which mould sections can each be fixed to the mother mould, one mould section being provided with a bush which is movable to a limited extent with respect to said section and can be connected to the mother mould, whilst the other mould section is provided with ejector means, the mother mould being provided with an injection nozzle and means for moving the bush relative to the mould section. With this arrangement only the at least two mould sections, the bush and the ejector means are replaced at the time of change-over.

For the quick-change mould described above, accurate centring is required only in respect of the section where gating takes place. The opposite sections of the mould can be fitted with some tolerance. Consequently rapid change-over can be achieved without too many complicated fixings.

The invention also relates to a method for injection-moulding an article, comprising the closing of mould sections which delimit a mould cavity, the introduction of plastic into said mould cavity via a gate, removal of the sprue by moving a part of the gate that is some distance away from the mould cavity, opening of the mould cavity and removal of the article, which method is characterised in that the movement of that part of the gate is carried out using a fluid which can be pressurised, and in that no pressure is exerted by said fluid when the mould is closed for injection.

BRIEF DESCRIPTION OF THE DRAWINGS

The invention will be explained in more detail below with reference to an illustrative embodiment shown in the drawing. In the drawing.

DETAILED DESCRIPTION OF THE INVENTION

Figure 1:
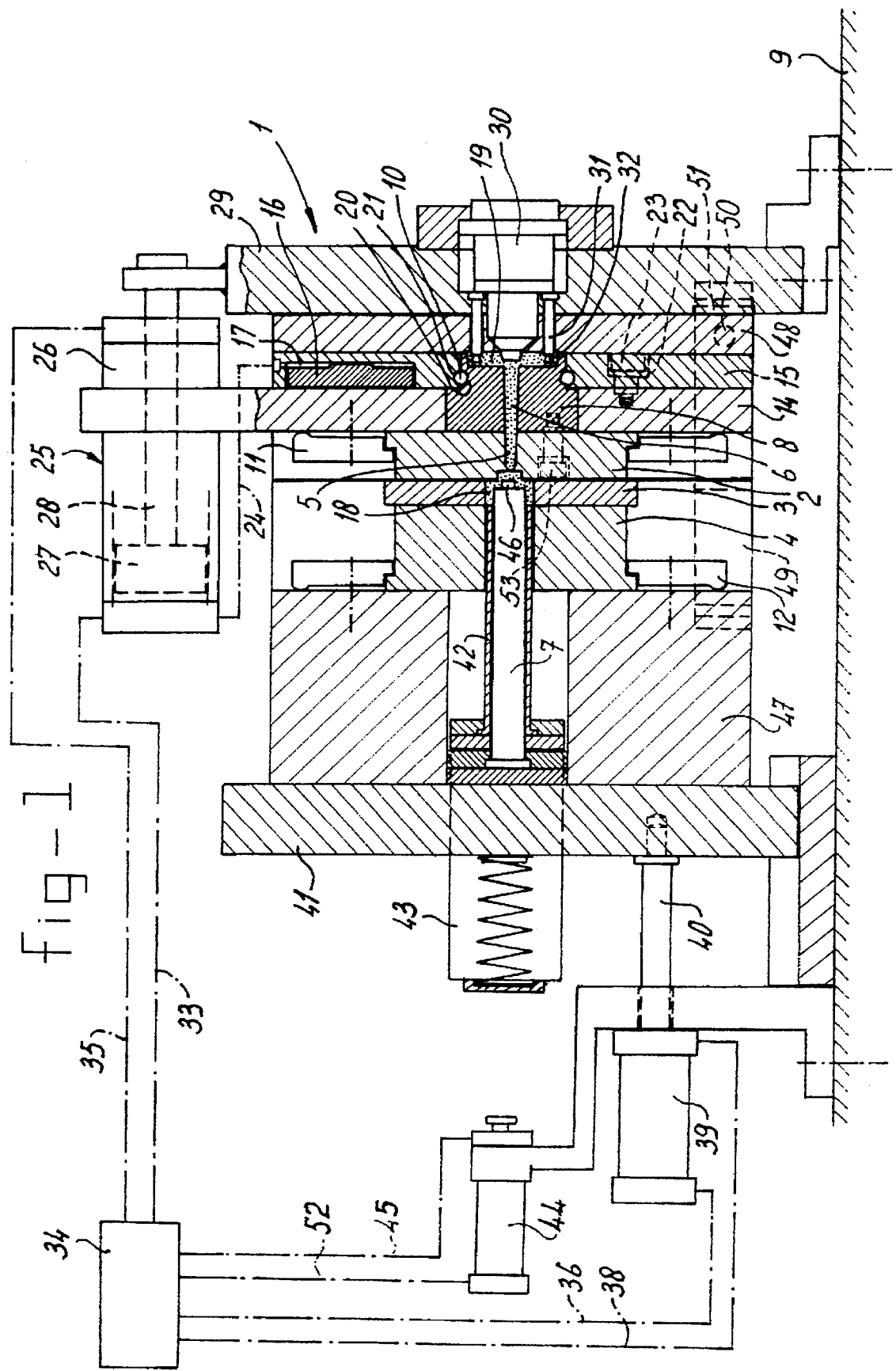
FIG. 1 shows a mother mould with an auxiliary mould incorporated therein, in partial cross-section in the position for introduction of plastic.

The injection mould according to the invention is indicated in its entirety by 1. In said mould the mould cavity is delimited by the right mould plate 2, the centre mould plate 3 and the left mould plate 4. Internally the mould cavity is delimited by core 7, which has free end 46, and an ejector 42. Said mould cavity is indicated by 18. A part of the gate which is indicated by 5 is located in right plate 2. A further part of the gate is located in bush 8 and this part is indicated by 6. Part 6 of the gate opens into a widening 19. Bush 8 is fixed to mould section 2 by means of bolts 53. Said bolts 53 are incorporated with their heads in chambers in the bush 8 with a play such that bush 8 and mould section 2 can be moved relative to one another over a short distance. Bush 8 is provided along part of its circumference with a groove 20 which, when bush 8 is fitted in connecting plate 15, coincides with a groove 21 in said plate 15, as a result of which a circular opening is delimited in which a dowel pin 10 or the like is fitted in order to connect bush 8 firmly to plate 15. Connecting plate 15 is provided with a stepped opening 22, in which a bolt 23 can be fitted which can be fixed to a mounting plate 14. Because the length of the shaft of bolt 23 is greater than the thickness of connecting plate 15 located underneath it, mounting plate 14 can execute a limited stroke relative to connecting plate 15. Mounting plate 14 is provided with fixings 11 for firmly incorporating right mould plate 2. Connecting plate 15 is provided with a piston chamber 17, in which a piston 16 is fitted so that it can move backwards and forwards. Piton chamber 17 is connected via a pipe 24 to a plunger unit 25, the casing 26 of which is firmly connected to the mounting plate 14, whilst the rod 28 connected to piston 27 can engage on plate 29, which is firmly connected to the machine frame 9. Injection head 30, which, if appropriate, is provided with a shut-of valve in a manner not shown in more detail and is connected to a source of fluid plastic material, is fitted in plate 29. Rod-shaped drawing elements 31 are located in the vicinity of injection head 30 and the free ends of said drawing elements are provided with a tapered section 32, which, as can be seen from FIGS. 1 and 2, can be accommodated in the cavity produced by the widening 19 in bush 8. Plate 48, which is provided with openings for accommodating drawing elements 31 and is movable to a limited extend relative to plate 29, is located between connecting plate 15 and plate 29. Said movement is effected by hook element 49. Said locking device 49 is fixed by means of pin 50 to plate 48 and accommodated by stop 51 such that it can be moved to a limited extent relative to plate 29. Locking device 49 is moved by (slidable) connection with mounting plate 14. Mounting plate 14 is guided, in a manner not shown in more detail, relative to plate 29 so that the latter is able to move in a controlled manner backwards and forwards relative to plate 29, under the influence of the plunger unit 25. To this end, the side lying behind piston 27 is not only provided with the connection for pipe 24 which has been described above but is also connected via pipe 33 to a control device 34. The section lying in front of piston 27 is connected via a pipe 35 to control device 34. On the other side, the control device 34 is provided with pipes 36, 38 leading to a jack unit 39, 40, the housing 39 of which is connected to the machine frame 9, whilst the piston rod 40 is connected to plate 41, which forms part of the other half of the mould. An ejector 42 is fitted in plate 41, which ejector engages via a yoke mechanism 43 on an ejector jack 44, which is connected to the frame 9. Pipes 45 and 52 are connected to said ejector jack. A feed and discharge system, which is not shown in more detail, for coolant or heating fluid can be located on core 7 to enable the temperature of the free end 46 to be controlled during the injection moulding operation. A filler element 47 is attached to plate 41 and, in turn, is provided with fixing 12 for interchangeable fixing of plates 3 and 4 which delimit the mould cavity.

Figure 2:
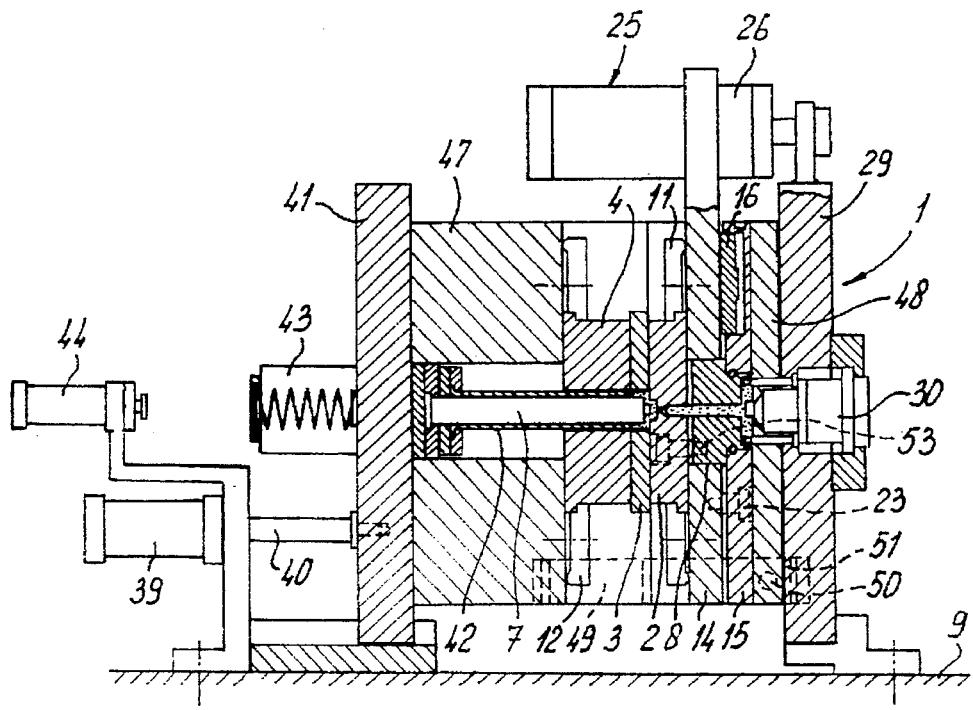
FIG. 2 shows the installation according to FIG. 1 during the first step of pulling the sprue away from the product.
Figure 3:
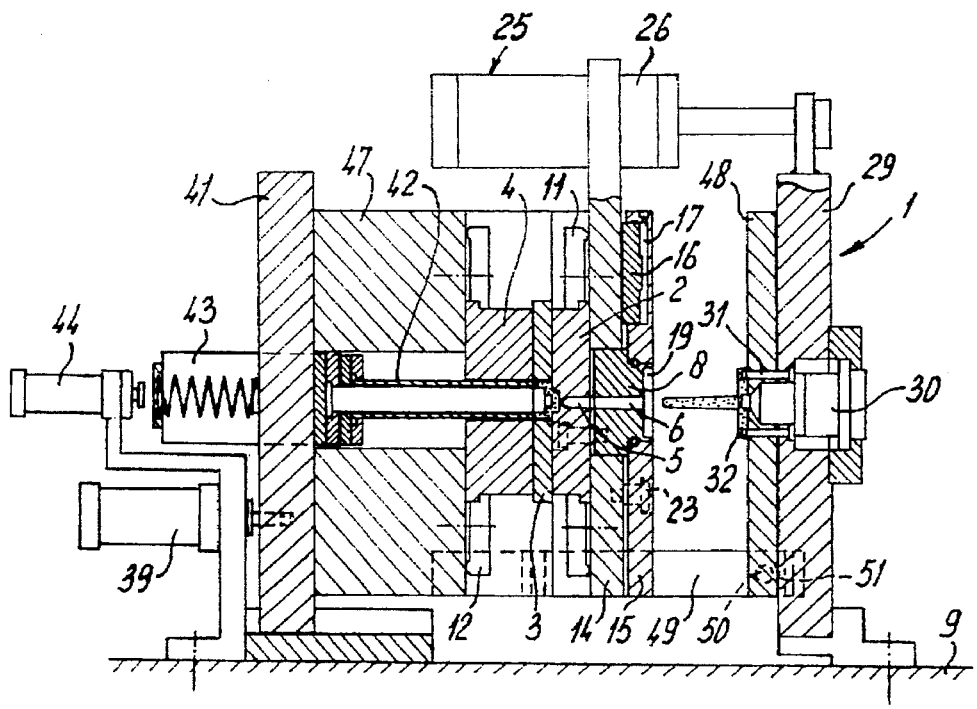
FIG. 3 shows the installation according to FIG. 2 during the second step of pulling out the sprue.
Figure 4:
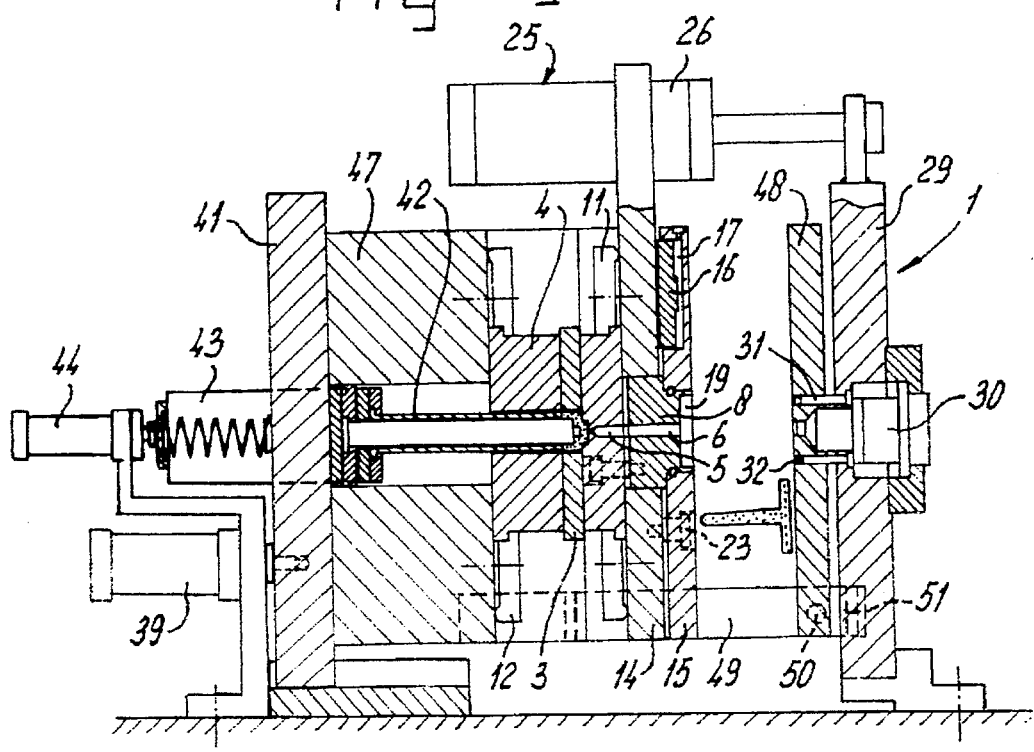
FIG. 4 shows the installation according to FIG. 3 during the third step of detaching and removing the sprue.
Figure 5:
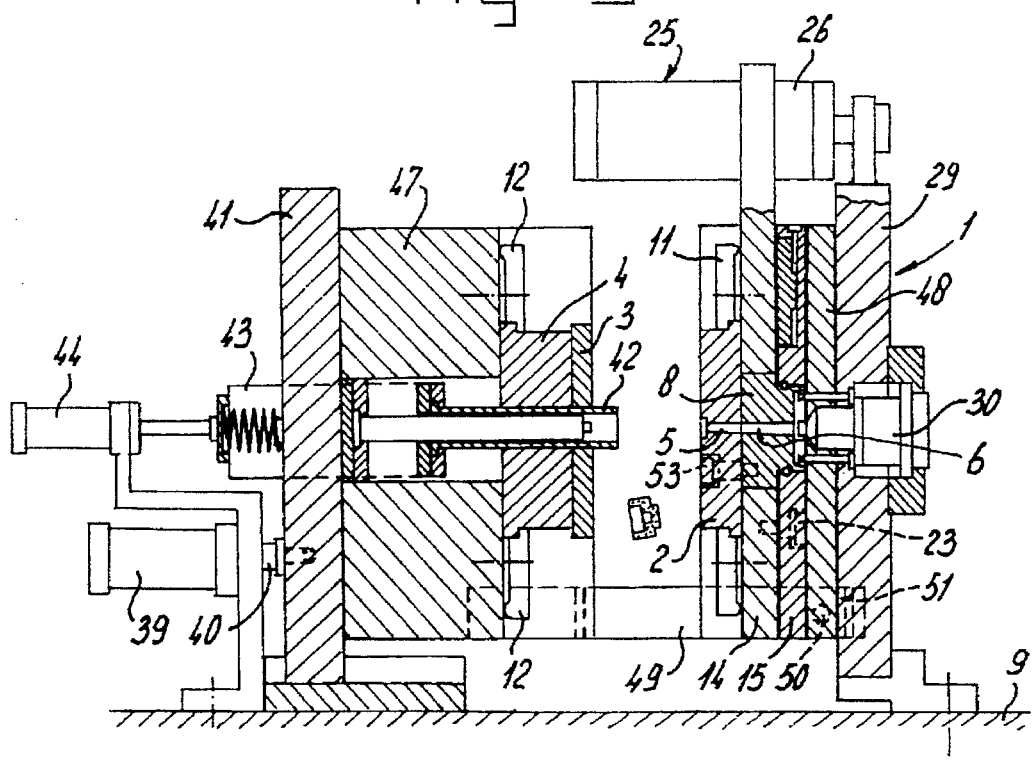
FIG. 5 shows the installation according to FIG. 1 during the step of ejecting the article.

The installation described above functions as follows. Starting from the position shown in FIG. 1, both the mould cavity and the gate are filled with fluid moulding material, such as plastic or an alloy. The course of solidification can be controlled by regulating the supply of fluid through core 7. Moreover, separate channels for the supply of fluid can be present in the various mould plates 2–4 delimiting the mould cavity. The connection between the cooling channels of the mould plates and, for example, filler element 47 can be provided by means of channels which are centred relative to one another and are sealed with the aid of O-rings. In this way it is possible in a simple manner to obtain a seal of the cooling channels directly when, for example, mould section 4 is changed, and it is not necessary to fit separate hoses and the like on such a mould section. After the product has solidified sufficiently, starting from the position in FIG. 1, a pressurized fluid, such as compressed air, is supplied, with the aid of control device 34, via pipe 33 to the left side to piston 27 and via pipe 24 to piston 16. When pressure is applied to both piston 16 and piston 27 there will initially be no effect because the mould is held in the closed position by jack system 39, 40. When rod 40 is retracted, filler element 47 moves to the left and, by appropriate selection of the ratio of the diameter of piston 16 relative to that of piston 27, piston 16 will first move from the position shown in FIG. 1 towards the left and thus move mounting plate 14 and connecting plate 15 a short distance apart. As a result the bush 8 attached to connecting plate 15 will move slightly relative to right mould plate 2. That is to say, the gate 5, 6 will be lengthened somewhat. As a result of the tapering of gate 6 into bush 8 and of the widening 19, the sprue will always break in a controlled manner at the point of attachment to the product when a tensile force is exerted on bush 8. The maximum force for detaching the sprue from the article and removal from the gate is overcome with the aid of piston 16 (FIG. 2). When rod 40 is further retracted a point is reached at which plates 14 and 15 can no longer be driven further apart because they are stopped by bolt 23, after which piston 27 is driven to the right, that is to say housing 26 together with mounting plate 14 are moved to the left. Because of the presence of the tapered sections 32 of drawing elements 31, the sprue is pulled in the manner known from the prior art from gate 6 and widening 19 of bush 8 (FIG. 3). When plate 14 is moved further to the left, plate 48 is pulled to the left, relative to plate 29, by hook element 49. During this movement the drawing elements come to lie entirely inside plate 48, so that the sprue is detached as shown in FIG. 4. When housing 26 is moved to the left, from FIG. 2 to FIG. 3, the left section of the mould also moves to the left. That is to say, jack unit 39, 40 does not impede the movement when rod 40 is further retracted. As a result, a relatively large passage is provided for the product to be ejected, yet the total opening path is limited, which results in a saving in time. At the end of the retracting movement of rod 40, ejector 42 is actuated with the aid of ejector jack 44, as a result of which the product falls out of the mould cavity as shown in FIG. 5. In this way it is always guaranteed that the sprue always drops out of the mould in the same way in a controlled manner.

When plates 14 and 29 are moved towards one another again, piston 16 is likewise moved back into the initial position and plate 48 is moved towards plate 29 again, so that the tapered ends 32 of the drawing elements 31 are again located in the widening 19. Operated by jack unit 39, 40, the left sections of the mould are then moved to the right again and the mould is closed, so that a fresh injection moulding operation can take place. In this way it is not necessary when the mould is closed at a later stage to overcome the force for moving piston 16 back into the starting position, because said piston has already been moved back. Partly as a consequence of this, it is possible to provide a so-called "soft close". This is understood to mean that the jack unit 39, 40 is operated using a relatively low pressure, so that the movement is stopped immediately if there is any hindrance whatsoever in the movement path of the left sections of the mould. Moreover, this movement under low pressure can take place at a relatively high speed under effective control.

For changing the mould in order to produce a different product it is necessary only to detach fixings 10, 11 and 12. By this means the mould plates 2, 3 and 4, together with bush 8, will be detached, possibly accompanied by the ejector mechanism 42. The latter depends on the shape of the following product to be produced. In some cases a number of ejector pins are be used in place of a bush-shaped ejector. If appropriate, inlets and outlets for a coolant fluid can be present between the various mould plates 2, 3 and 4 an the plates 47 and 14 respectively. Said inlets and outlets can be connected by means of internal channels to fixed parts of the installation in the manner described above. Controlled solidification can be achieved by cooling the product in various ways with the aid of sleeve 45 and the outer walls of the product with the aid of cooling in the mould plates 2–4. It is clean that this type of replacement of the mould sections can be carried out particularly rapidly. As an example, a change-over time of 2–5 minutes may be mentioned, compared with the change-over time of 2 hours which is customary according to the prior art.

Decentralised and centralised injection of products can be achieved in a particularly simple manner using the above construction. A particularly high stability can be achieved because the fixed parts of the so-called mother mould can be of heavy construction. The course of the process can be accurately controlled by means of further cooling, which is not shown. Centring of the various plates 2–4 relative to the adjacent parts can be carried out in any manner disclosed in the prior art. One possibility is to provide thickenings which fit in corresponding cavities. With the installation according to the invention, changing of the mould plates 2, 3 and 4 together with bush 8 is so simple that this can be carried out with the aid of a robot, so that fully continuous operation without a significant number of operators is possible.

Although the invention has been described above with reference to a preferred embodiment, it must be understood that numerous modifications can be made thereto. Thus, it is possible to use the mechanism for removal of the sprue with other types of moulds which are known in the prior art. Said moulds can also be injection moulds for very large runs which do not have the constructional features for rapid changing as in the case of the present invention. All such modifications fall within the scope of the present Application.

We claim:

1. In an injection mould comprising a stationary injection head (30) and at least two mould sections which delimit a mould cavity and are movable relative to one another, a gate (5) being fitted in one mould section (2) and a movable bush (8) being fitted adjoining said mould section (2) remote from the other said mould section (3), through which bush (8) the gate also extends, means being present to move the bush (8) relative to said mould section (2), as well as stop means to limit said movement; the improvement wherein said means for moving the bush (8) relative to said mould section (2) comprises a mounting plate (14) to which said one mould section (2) is adapted to be fixed, a connecting plate (15) which is movable to a limited extent relative to said mounting plate (15) and to which the bush (8) is adapted to be fixed, and jack means which operate between said plates (14, 15).

2. Injection mould according to claim 1, wherein jack means (39, 40) are present to move said mould section (4), remote from said mould section (2) comprising the gate, relative to the last-named mould section (2) and wherein auxiliary jack means (25) are present to move said last-named mould section (2), which comprises the gate, relative to a fixed injection head (30).

3. Injection mould according to claim 1, wherein means for removing sprue engage close to the side of the bush facing away from mould section (2).

4. Injection mould according to claim 1, comprising a mother mould in which an auxiliary mould is interchangeably incorporated, which auxiliary mould comprises at least two mould sections (2, 4) delimiting the mould cavity, which mould sections must each be fixed to the mother mould, one mould section (2) being provided with the bush (8) which is movable to a limited extent with respect to said one mould section and must be connected to the mother mould, whilst the other mould section (4) is provided with ejector means, and wherein the mother mould is provided with an injection nozzle (30).

* * * * *